Sept. 29, 1959 M. W. KEYES 2,906,317
METHOD OF SHAPING FIBROUS BODIES
Filed March 23, 1956
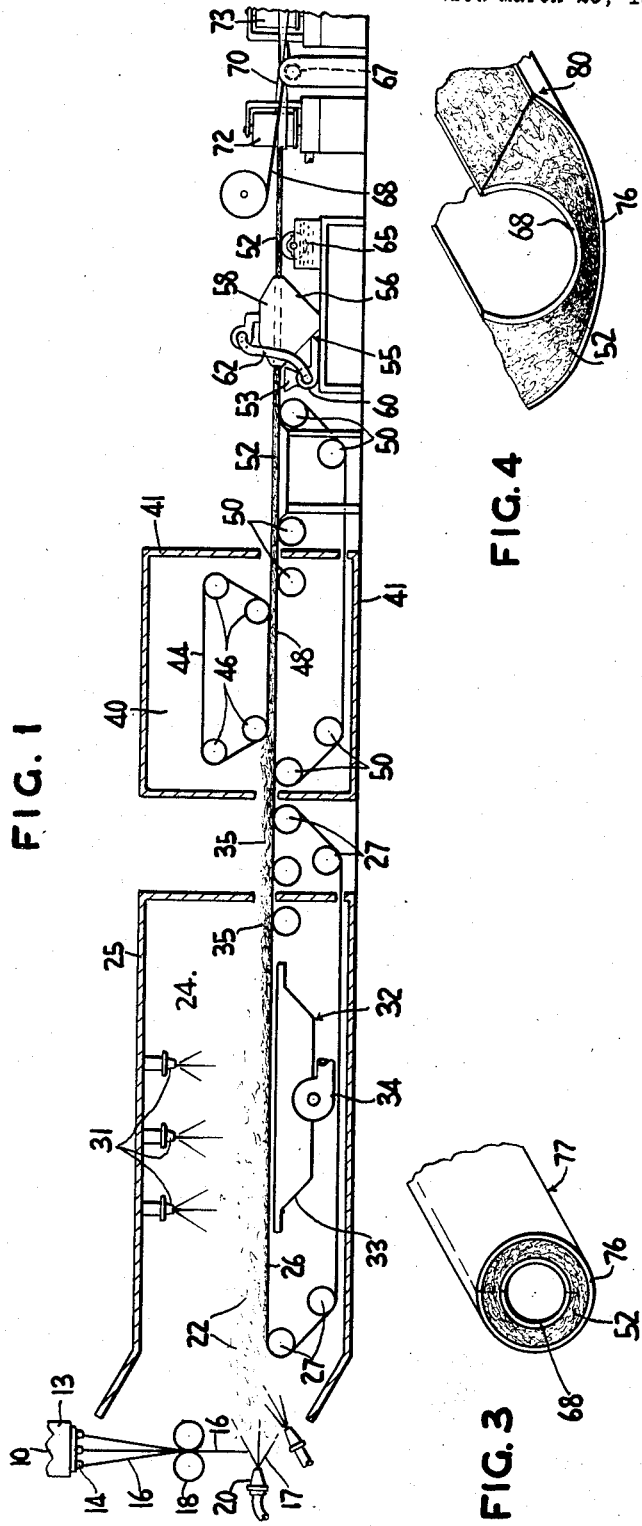
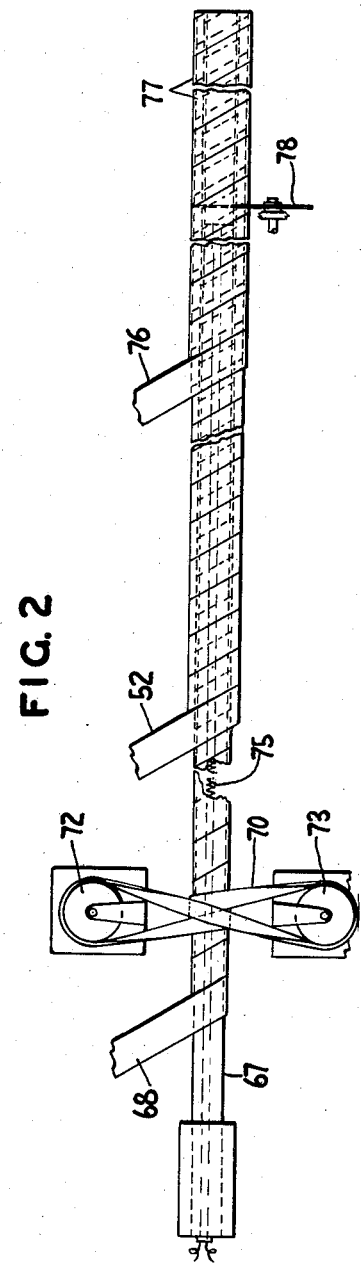
INVENTOR.
MARCUS W. KEYES
BY
Oscar L. Spencer
ATTORNEY

United States Patent Office 2,906,317
Patented Sept. 29, 1959

2,906,317

METHOD OF SHAPING FIBROUS BODIES

Marcus W. Keyes, Pittsburgh, Pa., assignor to Pittsburgh Plate Glass Company, a corporation of Pennsylvania Application March 23, 1956, Serial No. 573,566

4 Claims. (Cl. 154—28)

The present invention relates to a method of shaping porous, low density, fibrous bodies and it has particular relation to a continuous method of forming porous, low density, cylindrical, fibrous bodies suitable for use as pipe insulation.

Fibrous materials such as asbestos, glass fibers or rock wool are used in one form or another as thermal insulating materials. The present invention is particularly concerned with the use of glass fibers as a pipe insulation material, however, it is not limited to the use of glass fibers for this purpose. It is intended that the principles of the invention are applicable to other types of fibers and their use as insulating materials.

Glass fibers usable for insulation purposes are produced by attenuating rods or molten streams of glass into fine fibers by means of gaseous blasts. The fibers so produced are collected in haphazard relation in a fluffy, porous mass on a moving belt. A binder such as a thermoplastic or thermosetting resin is applied to the fibers at the same time as or after the fibers are collected on the belt. The fluffy, porous mass of fibers is then passed through an oven where the binder is cured and the fibers are bound to each other and fixed in their relationship to each other in the porous, low density body of fibers. Also, the mass is usually compressed slightly during curing so as to form a layer or blanket of uniform thickness.

In this way, a porous, low density, planar blanket of thermal insulation is formed. The blanket has dimensional stability as a result of the fibers being bound to each other. The blanket is resilient and may be compressed or deformed by an applied force, but when the force is released, the blanket will tend to return to its original planar position. For example, if the blanket is wrapped around a piece of pipe, it must be held in such position on the pipe, for it tends to return to its original, planar shape and spring off of the pipe. When such resin-bound, planar, fibrous blankets are employed as insulation in shapes other than planar, such as cylindrical pipe insulation, they must be held in place by adhesives, wrappings, or mechanical fastenings.

It is an object of the present invention to provide a method of producing a porous, low density, fibrous body of thermal insulation such as described above in cylindrical form so that it can be used as insulation for a pipe. The invention is not limited to the formation of cylindrical shapes of insulation but is applicable to the formation of insulation in various permanent shapes from a fibrous, planar, insulation blanket.

Several methods have been employed in the past to produce glass fiber pipe insulation in cylindrical form. In U.S. Patent No. 2,206,059, an uncured blanket of glass fibers is wrapped around a mandrel, heated and cured in such cylindrical position. After the glass fibers are cured in cylindrical position, the mandrel is removed. The fibers are not effectively bound in relationship to each other prior to wrapping around the mandrel, and therefore the blanket collapses when wrapped upon itself on the mandrel. The density of the blanket is thereby increased and the thickness of the blanket is reduced. The insulating value of such a blanket per inch of thickness does not change greatly with change of density within the relatively low density range of 0.5 to 5 pounds per cubic foot, however, the thermal insulation value of the blanket varies directly as the thickness of the blanket within this density range. Thus, it can be seen that the over-all insulation value per unit weight of a blanket is greatly decreased when the thickness of the blanket is reduced within this density range. The insulation value of a blanket decreases as the density increases above a density of about 5 to 15 pounds per cubic foot depending on fiber size, binder content, and other factors. It can be seen therefore that it is desirable to produce a blanket of relatively low density so as to obtain from it the maximum insulation value.

U.S. Patent No. 2,350,996 discloses a method of producing porous, low density glass fiber pipe insulation halves. This process involves passing an uncured, porous, low density blanket of glass fibers through a corrugating operation and heating the blanket to cure the resin while the blanket is in corrugated form. Thereafter, the corrugated blanket is slit in half so as to produce a plurality of half sections of pipe insulation. These pipe insulation halves possess the desired property of low density, however, they must be assembled into complete units, thereby requiring costly extra manufacturing operations. The process does not produce a product which is easily installed on a pipe by merely pulling a cylinder open, placing it around the pipe and allowing the resiliency of the cylinder to spring it into position on the pipe.

It has been proposed to form pipe insulation by continuously wrapping a cured, low density, planar blanket of glass fibers in strip form helically around a mandrel to form a cylinder, advancing the cylinder along the length of the mandrel and severing it into sections. Usually the glass fiber blanket is wrapped with an asbestos paper or other finish covering in this process. The pipe insulation section as thus formed is slit longitudinally to enable it to be fitted around a pipe. When it is slit, it has a tendency to spring back into the original planar structure of the glass fiber blanket. Thus, a permanent cylinder of insulation is not formed.

It is therefore another object of the present invention to produce low density, porous, cylindrical, glass fiber pipe insulation which has the property of retaining its cylindrical shape. The cylindrical pipe insulation should not unfold when slit longitudinally. The cylindrical pipe insulation should be resilient and snap back into substantially cylindrical shape when pulled apart at the slit portion for insertion around the pipe.

It is a further object of this invention to produce a cylindrical pipe insulation in a continuous method from a porous, low density blanket of glass fibers as made in a conventional glass fiber insulation process.

It is a further object of this invention to provide a method of permanently reshaping a planar, low density, porous blanket of glass fibers so that it retains all of its desirable properties in its new shape and also contains new properties. In this regard, it is a particular object of the invention to permanently shape a planar, low density blanket of glass fibers into cylindrical form.

It is another object of this invention to provide a method of reshaping a blanket of glass fibers so as to decrease its density by expanding or increasing the volume of the blanket. In such case, the planar shape of the blanket may or may not be changed, but the blanket is expanded and the fibers are permanently bound in the expanded condition of the blanket so as to provide a blanket of increased thickness and lower density.

Other objects and advantages of the present invention will become apparent from the following description of the drawing in which:

Fig. 1 is a diagrammatic elevation of an apparatus suitable for forming cylindrical, glass fiber, pipe insulation;

Fig. 2 is a diagrammatic plan view of a portion of the apparatus shown in Fig. 1 illustrating more particularly a mandrel and a method of wrapping a strip of glass fibers around the mandrel;

Fig. 3 is a perspective view illustrating a piece of cylindrical, glass fiber, pipe insulation as produced by the apparatus shown in Figs. 1 and 2;

Fig. 4 is a perspective view illustrating a piece of pipe insulation as produced without benefit of the teachings of the present invention.

In Fig. 1 of the drawing, an apparatus suitable for producing fine glass fibers and combining them into cylindrical pipe insulation is shown. Molten glass 10 is held in a container 13 having a number of orifices 14 in the bottom thereof for issuance of primary glass rods 16 therefrom. The rods 16 are drawn from the container 13 and directed into the path of an attenuating force in the form of a gaseous blast 17 by means of rollers 18. The gaseous blast 17 is formed by a suitable burner 20. The heat and force of the blast attenuates the rod into a number of fine glass fibers 22, sometimes referred to as secondary fibers.

Such process of forming very fine fibers is more fully described in U.S. Patents Nos. 2,489,242 and 2,489,243. It is to be understood that the present invention is not intended to be limited to a method of shaping glass fiber blankets made by such process, but is intended to include a method of shaping glass fiber blankets made by other methods of forming heat softenable mineral materials into fine fibers including other methods wherein a primary fiber or rod is formed and then attenuated into small secondary fibers as well as those methods whereby fine fibers are formed directly from molten, thermoplastic material.

The fine fibers are carried by the attenuating force into an area known as a forming or collecting area 24 where they are collected on a suitable moving collecting system. As shown in the drawing, the forming area 24 is enclosed by a forming hood 25 made of sheet metal or other suitable material. A continuous, movable, foraminous collecting belt 26 is mounted on a set of driving rollers 27 in the lower part of the forming hood. One of the rollers 27 is driven by suitable driving means (not shown) operatively connected thereto.

A binder is applied to the fine fibers 22. The binder may be applied from a spray gun 30 directed on the fibers immediately as they are formed or the binder may be applied to the fibers on the collecting belt 26 from spray guns 31 supported at various positions in the forming area 24, such as at the top and the sides of the forming area.

The binder may be any one or a combination of a number of organic resins or plastics, among which are included thermosetting resins such as phenol formaldehyde, urea formaldehyde, melamine formaldehyde, alkyd resins including styrenated polyesters, epoxy resins, silicones, and carbonate ester resins, thermoplastic resins such as the cellulose ester resins, polyacrylates, vinyl resins such as polyvinyl chloride, polyvinyl acetate and mixtures thereof, polyvinylidene chloride, polystyrene and various natural and synthetic rubber latices which are useful as binders. Binders which are cured or polymerized by means other than heat, for example, by polymerization catalysts are contemplated. Inorganic binders such as sodium silicate solutions, fibrous clay, bentonite, and low melting frits may also be used. Thermosetting resins are the preferred binders.

The amount of binder employed is that amount which is sufficient to bind the fibers to each other at their points of crossing but not destroy the low density of the blanket. The binder is also usually distributed at other points on the surfaces of the fibers to effect some degree of binding or be potentially capable of future binding action when the blanket is reshaped. The blanket usually contains 3 to 40 percent by weight of binder depending upon the particular binder employed.

The formation of the layer of fibrous material on the collecting belt 26 is aided by air flowing down through the belt 26 carrying the floating fine fibers 22 down onto the moving belt. Such air flow may be created in the form of suction produced by suitable means 32 located under the belt 26. This suction means comprises an intake chamber 33 located directly under the receiving section of the collecting belt 26 and a suction pump 34 connected thereto.

The layer of fibers 35 thus formed is transported from the forming area 24 into a curing area 40 wherein heat is applied to the layer to set or cure the binder. The curing area may be enclosed by sheet metal 41 or other suitable material. If desired, the layer 35 may be slightly compressed to a uniform thickness by means of an endless foraminous belt 44 rotating on rollers 46 mounted in the curing area 40 above conveyor 48 which supports and carries layer 35 through the curing oven 40. The conveyor 48 is mounted on a set of rollers 50, one of said rollers being driven by suitable means (not shown).

The cured, porous, low density, glass fibrous blanket 52 passes from the curing oven after the binder has been cured. The blanket at this stage of the process is in planar form and more or less tends to remain in this form depending upon the amount of binder employed and the degree of cure of the binder. The individual fibers in the blanket are held in position relative to each other at their points of crossing and/or other points by the binder. The blanket is compressible and resilient and tends to return to its original shape when so compressed. This property is desirable so that the blanket maintains its high porosity and low density, which properties provide it with its desirable thermal insulating, cushioning, filtering and acoustical properties. The blanket has a definite thickness, for example, ⅛ to 1 inch or greater, and is to be distinguished from a mat or sheet of glass fibers wherein the thickness of the mat is only that of the diameter of several fibers. The density of the blanket preferably may range from 6 to 0.2 pound per cubic feet or lower.

As stated above, it is desired to reshape the blanket of insulation without destroying its low density so that it may be employed to insulate objects having other than planar surfaces. The high resiliency of the blanket renders this difficult. When the blanket is applied to various shapes such as pipes, it has a tendency to return to its original planar shape. Thus, it requires additional reinforcing or fastening means to maintain it in the new shape.

In accordance with the present invention, a method of reshaping such a blanket without changing its useful properties is provided. This method entails reshaping the blanket and binding or rebinding the fibers in the blanket in a new relation to each other so as to maintain the blanket permanently in its new shape. In a preferred embodiment of the invention, an additional amount of binder is added to the blanket prior to, at the same time, or after the blanket is reshaped, to aid in holding the fibers in their new relationship in the reshaped blanket. The added binder may be the same binder as that originally used to form the blanket, or it may be a different binder. It may be a thermosetting or thermoplastic resin and may be in liquid or powdered form.

It is preferred that the additional binder be in powdered form for several reasons. The powdered resin can be more thoroughly distributed in the blanket 52. The blanket may be vibrated during addition of the powdered binder to aid in distributing the binder in the blanket. If a liquid binder is added to the blanket, it has a tendency to make the blanket soggy and collapse, thereby destroying the low density and high thermal insulating value of the blanket. Also, liquid binders tend to remain on the surface of the blanket and do not pass as easily into the interior of the blanket as do powdered binders.

It is not always necessary to apply additional binder to the fibers of the blanket to obtain binding of the fibers in their new relationship in the reshaped mat. For example, if the original binder is composed in whole or in part of a thermoplastic binder, heating of the reshaped blanket may be sufficient to effect softening of the thermoplastic binder and provide binding of the fibers in their new relationship.

As another embodiment of the invention, the original binder applied to the blanket may be only partially cured in the curing section 40. The curing is sufficient to hold the fibers in the blanket in fixed relationship to each other and provide porosity and low density to the blanket, however, it is an incomplete cure. When the blanket is reshaped, the binder is completely cured and the blanket retains its new shape. In a further embodiment of the invention, a dual purpose binder can be originally applied to the glass fibers 22 in the formation of the blanket 52. Such a binder may contain a fast acting binder component and a slow acting binder component. The fast acting component operates during the original curing in oven 40 and the slow acting binding ingredient is activated after the blanket is reshaped.

The amount of binder which is originally present and which is added is that amount which is sufficient to bond the fibers to each other in relatively fixed relationship so as to provide porosity and low density to the product, but not so much as to destroy these properties. The amount and type of binder to be employed as the original and/or the additional binder is believed to be within the skill of the art of a trained chemist. Generally, 3 to 50 percent by weight of the reshaped glass fiber blanket may be constituted of binder material.

The invention is particularly adaptable to a method of reshaping fibrous blankets into cylindrical pipe insulation. The blanket 52 of insulation moves continually from the curing oven 40, and a powdered binder 53 such as powdered phenol formaldehyde is applied to it. In the apparatus shown in the Fig. 1, the powdered binder 53 is blown into and through the blanket by suitable applicator means 55. The applicator means 55 is composed of a lower chamber 56 and an upper chamber 58. The powdered binder is blown by means of blower 60 into the lower chamber and up through the blanket into the upper chamber. Any binder passing through the blanket is returned to the blower 60 through line 62.

Thereafter, the blanket of glass fibers passes over a roller applicator 65 which applies a coating of a suitable adhesive, such as a sodium silicate solution, to the underneath surface of the blanket. Other adhesives or binders may be used. The blanket then passes onto a mandrel 67, on which it is wound helically to form a cylinder of insulation. In such form, the blanket is heated and the additional binder 53 is cured so as to permanently shape the blanket in the cylindrical helical shape.

In the formation of the cylindrical pipe insulation, a stationary, smooth surfaced, cylindrical, tapered mandrel 67 is employed. As a core for the pipe insulation, a sheet of asbestos paper 68 in strip form may be first wound around the mandrel 67 in helical fashion and advanced around and longitudinally of the mandrel by means of a belt 70 helically wrapped around the mandrel in frictional contact with the asbestos paper 68. The belt 70 is wrapped around two spools 72 and 73 located on opposed sides of the mandrel and is caused to rotate around the mandrel by the rotation of the two spools. The asbestos paper 68 is lead onto the mandrel at an angle and the angular rotation of the paper 68 on the mandrel by means of the belt causes it to move longitudinally of the mandrel. Materials other than asbestos may be used to form the core. For example, the core material may comprise a thin glass fiber mat or tape or a thin layer of a high density, glass fiber body.

After the core of asbestos paper 68 is applied to the mandrel, a strip of glass fiber blanket 52 is wound helically on top of the core. The sodium silicate adhesive on the under surface of the fibrous strip 52 causes the fibrous strip to adhere to the asbestos sheet 68. The rotation of the asbestos core 68 pulls the adhered strip of glass fibers onto and around the mandrel. The glass fiber strip is wound helically around the mandrel and butted edge to edge to form a continuous, cylindrical shape. It moves longitudinally of the mandrel with the asbestos core sheet 68.

The mandrel is heated by means of resistance elements 75 located in the interior of the mandrel. The heat applied to the mandrel causes the sodium silicate to dry and adhere the glass fiber layer to the asbestos layer and further causes the additional binder 53 to bind the fibers of the glass fiber blanket in their new cylindrical shape. The heat may also be applied by other means (not shown) such as by a chamber built around the mandrel and adapted to supply hot air or radiant heat externally of the strips wrapped around the mandrel. It is also contemplated that cylindrical sections of the insulation may be severed and removed from the mandrel and cured in a suitable oven. Other means for heating and curing the resin and sodium silicate adhesive will be readily apparent.

More than one layer of glass fiber strips may be applied to the mandrel to provide greater insulation thicknesses. The additional layers may comprise cured, partially cured, or uncured layers if desired. A finish covering 76 may be applied over the glass fiber strip 52 in the same manner as the glass fiber strip is applied to the asbestos sheet 68. The finish covering may be another layer of asbestos paper or a sheet or mat of glass fibers or other surface finishing material.

When the cylindrical, fibrous insulation has been heated and cured to provide it with its new permanent shape, it is severed into sections 77 by means of saw 78. The cylinder of insulation is further slit longitudinally along one side. This cutting extends through the one side of the cylinder and into the interior surface of the opposed side of the cylinder so as to score that surface. The cylinder as thus prepared is ready for installation on a pipe. It is shown in Fig. 3.

An advantage of the present invention may be described in conjunction with Fig. 4 which illustrates a section of pipe insulation 80 which has been produced from a planar blanket of insulation without the benefit of the present invention. The insulation shown in Fig. 4 has not been treated with the additional binder prior to being wrapped around the mandrel. In this case, when the cylindrical insulation was slit longitudinally along one side thereof, the forces in the fibrous blanket 52 caused it to tend to return to its original planar shape. Such insulation 80 must be forced around the pipe to conform to the shape of the pipe and held there by mechanical means. The reshaping and rebinding as taught by the present invention obviates such requirement.

Although the present invention has been described with respect to specific details of certain embodiments thereof, it is not intended that such details be limitations upon the scope of the invention except insofar as set forth in the accompanying claims.

I claim:

1. A method of forming a shaped porous body which comprises providing a planar, porous, resilient, fibrous mat in which the fibers are bound to each other in fixed, haphazard relation by means of a resinous binder so that the mat tends to spring back to its planar shape when bent, said mat having a density of 0.2 to 6 pounds per cubic foot, changing the shape of the mat without substantially reducing the thickness of the mat, the fibers throughout the mat when formed in the new shape being bent and provided with an additional amount of a curable, resinous binder, and curing the additional binder to permanently bond the fibers in their new bent position and the mat in its new shape, the total amount of resinous binder in the final porous product being 3 to 50 percent by weight of the product.

2. A method of forming a shaped porous body which comprises providing a planar, porous, resilient, fibrous mat in which the fibers are bound to each other in fixed, haphazard relation by means of a cured, thermosetting, resinous binder so that the mat tends to spring back to its planar shape when bent, said mat having a density of 0.2 to 6 pounds per cubic foot, changing the shape of the mat without substantially reducing the thickness of the mat, the fibers throughout the mat when formed in the new shape being bent and provided with an additional amount of a curable, thermosetting resinous binder, and curing the additional binder to permanently bond the fibers in their new bent position and the mat in its new shape, the total amount of resinous binder in the final porous product being 3 to 50 percent by weight of the product.

3. A method of forming a shaped porous body which comprises providing a planar, porous, resilient, fibrous mat in which the fibers are bound to each other in fixed, haphazard relation by means of a resinous binder so that the mat tends to spring back to its planar shape when bent, said mat having a density of 0.2 to 6 pounds per cubic foot, wrapping the mat around a mandrel without substantially reducing the thickness of the mat to form a hollow, cylindrical, porous body of insulation, the fibers throughout the mat when formed in the cylindrical shape being bent and provided with an additional amount of a curable, resinous binder, and curing the additional binder to permanently bond the fibers in their new bent position and the mat in its new cylindrical shape, the total amount of resinous binder in the final porous product being 3 to 50 percent by weight of the product.

4. A method of forming a shaped porous body which comprises collecting a layer of fibers in the form of a limp, planar, porous blanket in which the fibers are in haphazard relation to each other but not permanently bound in such relation, said fibers having a coating of a curable resin on at least a portion of their surfaces, curing the resin to bind the fibers in fixed relation to each other so as to form a planar, porous, resilient fibrous mat having a density of 0.2 to 6 pounds per cubic foot, which mat tends to spring back to its planar shape when it is deformed from such shape, changing the shape of the mat without substantially reducing the thickness of the mat, the fibers throughout the mat when formed in the new shape being bent and provided with an additional amount of a curable resinous binder, and curing the additional binder to permanently bond the fibers in their new bent position and the mat in its new shape, the total amount of resinous binder in the final porous product being 3 to 50 percent by weight of the product.

References Cited in the file of this patent

UNITED STATES PATENTS

| | | |
|---|---|---|
| Re. 23,899 | Robinson | Nov. 23, 1954 |
| 2,206,059 | Slayter | July 2, 1940 |
| 2,288,072 | Collins | June 30, 1942 |
| 2,296,781 | Farny | Sept. 22, 1942 |
| 2,639,759 | Simison | May 26, 1953 |
| 2,723,705 | Collins | Nov. 15, 1955 |
| 2,731,067 | Miller | Jan. 17, 1956 |
| 2,778,405 | Stephens et al. | Jan. 22, 1957 |